United States Patent
Plini

(10) Patent No.: US 8,276,337 B2
(45) Date of Patent: Oct. 2, 2012

(54) LOW ENERGY CONSUMPTION CLIMATE CONTROL SYSTEM AND METHOD FOR THE REALIZATION OF HIGH HEAT-SOUND INSULATION BUILDING

(75) Inventor: Paolo Plini, Rome (IT)

(73) Assignee: Caebit S.r.l., Rome (IT)

( * ) Notice: Subject to any disclaimer, the term of this patent is extended or adjusted under 35 U.S.C. 154(b) by 0 days.

(21) Appl. No.: 12/671,600

(22) PCT Filed: Jul. 28, 2008

(86) PCT No.: PCT/EP2008/059899
§ 371 (c)(1),
(2), (4) Date: Feb. 1, 2010

(87) PCT Pub. No.: WO2009/016163
PCT Pub. Date: Feb. 5, 2009

(65) Prior Publication Data
US 2011/0220319 A1  Sep. 15, 2011

(30) Foreign Application Priority Data
Aug. 1, 2007  (WO) .................. PCT/IT2007/000553

(51) Int. Cl.
*E04B 1/70* (2006.01)
*E04F 17/00* (2006.01)
(52) U.S. Cl. .................. 52/302.1; 52/173.1; 52/236.6; 454/229; 454/239; 454/256
(58) Field of Classification Search ................. 52/173.1, 52/302.1, 302.3, 378, 379, 236.5, 236.6, 52/302.4, 220.3; 454/229, 239, 256
See application file for complete search history.

(56) References Cited

U.S. PATENT DOCUMENTS

| | | | |
|---|---|---|---|
| 4,408,596 A | | 10/1983 | Worf |
| 5,761,864 A | * | 6/1998 | Nonoshita .................. 52/302.3 |
| 6,220,523 B1 | * | 4/2001 | Fiedrich ...................... 237/69 |

(Continued)

FOREIGN PATENT DOCUMENTS

EP   1136632   9/2001

(Continued)

*Primary Examiner* — Brian Glessner
*Assistant Examiner* — Brian D Mattei
(74) *Attorney, Agent, or Firm* — Gavrilovich, Dodd & Lindsey LLP; Gregory P. Einhorn

(57) ABSTRACT

In a climate control system for buildings, a number of renewable energy sources (photovoltaic and/or eolic, geothermal and the like) are utilized to obtain a flux of constant temperature fluid to be circulated into radiating pipes placed in continuous spaces or gaps defined in the perimeter walls and floors of said buildings. A desired variable flux of air is made to circulate in said spaces or gaps, to be heated or coiled by said radiating pipes. One said flux of air reaches the desired temperature, its circulation is stopped, to obtain a thermal insulating layer of air, in thermal equilibrium with the rooms to be air conditioned.
In the matters of civil, trade, industrial, and also prefabricated buildings endowed with elevated features in heat-sound insulation, it has been utilized a particular simple method for the realization of system of hollow spaces or gaps situated between the outer and inner surface of the building, mainly based on the laying of a series of panels; i.e. thin metal sheets, located.
In particular, suitable hooks, joined to the structure of studs and Beams, support horizontal bars vertically lined up, around which a thin metal sheet, preferably as an interrupted ring, is laid.

27 Claims, 11 Drawing Sheets

U.S. PATENT DOCUMENTS

| | | | |
|---|---|---|---|
| 7,028,685 B1 | 4/2006 | Krecke | |
| 2002/0073628 A1* | 6/2002 | Dextras | 52/1 |
| 2004/0026525 A1* | 2/2004 | Fiedrich | 237/69 |
| 2004/0040693 A1* | 3/2004 | Fiedrich | 165/56 |
| 2007/0039609 A1* | 2/2007 | Huebner et al. | 126/570 |
| 2010/0102137 A1* | 4/2010 | Plini | 236/44 |
| 2010/0236763 A1* | 9/2010 | Torok | 165/121 |

FOREIGN PATENT DOCUMENTS

| | | |
|---|---|---|
| FR | 2095793 | 2/1972 |
| FR | 2894649 | 6/2007 |
| GB | 1142720 | 2/1969 |

\* cited by examiner

Fig. 9  SECTION Z-Z

LOW ENERGY CONSUMPTION CLIMATE CONTROL SYSTEM AND METHOD FOR THE REALIZATION OF HIGH HEAT-SOUND INSULATION BUILDING

FIELD OF THE INVENTION

The invention refers to a low energy consumption climate control system, more specifically it refers to a climate control system suitable for both home and industrial applications: the system allows easy control of indoors environmental conditions, substantially cutting down energy consumption whilst maintaining a light and relatively simple construction frame.

Ways of improving climate control and healthiness in homes and work places have always been sought. However, efforts to resolve the issue of low energy consumption climate control and to produce zero-emission dwellings have only been made in the last few years, often encouraged by proposals and specific regulations coming from important research institutes.

The growing increase of pollution, of the piling up of carbon dioxide in the atmosphere, one of the important causes of the greenhouse effect, along with the daily decay of the energy crisis, make essential the realization of suitable strategies in order to limit power consumption, both contributing to the decrease of pollution due to fossil fuels and greenhouse effect, and reducing the considerable expenses for power production.

The attempts to reach these purposes are too numerous to be remembered; in the building field, this invention is referred to, many proposals have been advanced, mostly based on the improvement of materials and/or the utilization of alternative sources of energy. This leads to the statement of "zero-energy buildings", defined as housing units having a thermal waste lower to 20 KW m2/year. On this matter, in Italy, the autonomous province of Bolzano has proposed a building classification as follows: (i) Casa Clima Oro, with a thermal demand/consumption below 10 KW m2/year; (ii) Casa Clima A with a thermal demand/consumption below 30 KW m2/year; Casa Clima B with an energy demand/consumption below 50 KW m2/year.

Similarly, enterprises and individual inventors are trying to identify materials and project concepts aimed at significantly reducing building energy consumption, made necessary by the increasing energy crisis, the necessity to improve environmental conditions and to comply with international rules and agreements.

As a matter of fact, these attempts to find a solution to the energy consumption problem rely on already known building techniques such as high width walls or on improving thermally insulating materials such as beehive-hollow bricks, expanded materials. The recent Italian Financial Law has dealt with this matter. Other methods rely on renewable energy of energy, such as solar thermal and photovoltaic solar panels, wind power generators, geothermal power plants and so forth.

U.S. Pat. No. 6,293,120 claims an air-conditioning system for a house utilising geothermal power, including, on its turn, a thermal energy storage system, with energy being transferred to an air-flow which is directed through a layer of gravel underneath the building in order to create a "tank" of thermal energy and, finally, means to convey air at a controlled temperature and humidity from said layer of gravel to the inside of the building.

Apparently, such a system is only suited to be used in smaller size buildings such as a detached house and furthermore it does not provide specific particular systems to limit thermal dissipation except high width walls and/or thermally insulating materials.

U.S. Pat. No. 6,293,120 utilizes a solar collector in order to create a warm fluid; different areas and/or orientations of the collector, each with its own system of fluid circulation, make it possible to obtain fluids at different temperatures which are utilized in thermal accumulators placed one around the other, with temperatures decreasing from the centre to the outer limit so as to minimize heat loss. A system of heat exchangers allows to obtain water, or any suitable fluid, at a desired temperature, to be conveyed towards a system of pipes buried within the walls and/or floor of a house so as to allow climate control. Again, high width walls and thick thermally insulating panels are used.

U.S. Pat. No. 7,028,685 describes an air conditioning system for buildings where a solar collector sends heated fluid to a thermal accumulator where an air-flow is directed and subsequently conveyed to the different rooms to be air-conditioned and then released in the atmosphere; the incoming air-flow runs through a pipe that is coaxial to another pipe carrying air that is previously heated in the thermal accumulator. This system of pipes to covey air is placed in a gap within the outer wall of the building, such wall being made of a load bearing central structure endowed with thermally insulating panels facing both towards the inside as well as the outside.

Similar concepts to the ones above mentioned are illustrated, for instance, in the U.S. Pat. No. 4,375,831, in JP 2005164160, JP 2006010098 and in the French Patent Application 2,884,300.

Summing up, the present building system utilizes bearing horizontal structures (beams and floors) and perpendicular structures (columns, pillars and plugging walls) properly insulated. The healthy conditions inside traditional buildings depend, as it has clearly been reported, on quality and quantity of the layer of utilized material and on the energy introduced into the housing units in order to balance energy absorption and dissipation.

Anyway, there are different problems concerning this consolidated and universally applied way of building realization; in particular:

1. discontinuity of insulating structure generally placed in touch with vertical walls and, only rarely, with some horizontal walls;
2. presence of thermal bridges between inner and outer structures, also as a consequence of the already mentioned discontinuity;
3. necessity of remarkable insulating thicknesses obtained by the assembly of insulating elements and/or high width walls with the subsequent energy waste concerning the production systems of utilized materials;
4. difficulty in obtaining the wished conditions of thermal hygrometric uniformity in the housing environment.

Prior art proposed air-conditioning technologies are fundamentally based on simple methods of heat accumulation and thermal insulation; whilst leaving heating and cooling methods unchanged and basically consisting of systems that direct air-flows to rooms through specific openings in the walls and/or ceilings and floors or, that direct a fluid at a desired temperature through pipes buried in the walls or in the floors.

SUMMARY OF THE INVENTION

The instant invention proposes a particular structure where, between an inner and an outer wall, and similarly between a superior (i.e. a ceiling) and a lower wall (i.e. a floor), is inserted a series of panels, separated by the walls and among them, in order to create isolated air spaces; in the gap nearer the inner wall and/or the lower wall, a pipe system is placed where a fluid at a desired and constant temperature runs so allowing the establishing, inside the said gap, of an "air cushion", at desired and constant temperature, which constitutes both the air-conditioning element for rooms closed by said walls and a suitable energy driving force.

The instant invention utilises a particular structure for the floors and perimeter walls of the building to be air-conditioned such walls and floors being made of light materials.

Thermal insulation is based on thermally insulating materials as much as on exploiting the air's ultra-low thermal conductivity.

As will be seen further on, in the description of enclosed drawings, invention present refers to a climate control system for buildings, both residential and industrial, having perimeter walls and floors, including a first system to generate and accumulate electricity from renewable sources, a second geothermic system. Said perimeter walls and floors composed of a plurality of parallel spaced-apart continuous panels, void spaces or gaps defined between different panels, air-flow circulation in at least some of said gaps, a fourth system for monitoring and controlling temperature and humidity of said air-flow. In the perimeter walls, generally comprising an outer wall (for example, a solid brick wall) and an inner wall (for example, a hollow brick wall), said outer and inner walls being spaced-apart, a space or gap there-between is further divided into at least three spaces or gaps (parallel to said inner and outer walls) by the least continuous heat-insulating panels. The gap towards the outer wall, of lesser width than the others, contains a further thin panel in the form of a metallic, breathable sheet reflective to thermal fluxes, that may be coated by a said heat-insulating panels, said further panel being detached from the external wall. A side of the other heat-insulating panel facing directly towards the internal wall is coated by a continuous metallic, non-breathable sheet reflective to thermal fluxes.

A gap underneath the floor is insulated from the ceiling below by a horizontal panel made of a thermally insulating material and also coated with a non-breathable metal sheet on the side facing the floor. A number of radiating pipes is placed within this gap beneath the floor and in the smaller gap towards the external wall, in said pipes a fluid, at a desired temperature and coming from the aforementioned geothermic system, circulated.

Within the above gaps properly treated and dehumidified air is circulated at a desired temperature.

The air-flow within said gaps is monitored and regulated by a centralised remote control system.

Said metallic sheets are placed on thermally insulated panels situated in the gaps within the side walls and underneath the floor, they can either be integral to said panels or detached; in the latter case it is possible to utilise, as will be shown further on, a well know principle in thermal exchange physics to further lower heat dissipation outside the building utilising present invention.

The working principle of the climate control system as indicated in the invention described herewith is based on the active utilisation, so to speak, in an absolutely innovative way, of the gaps within the side walls and the floor.

Indeed, the fluid of geothermal origin circulated by said radiating pipes within the gaps exchanges heat with the air here in contained as much by convection as, and above all, by radiation bringing it to the desired temperature.

In turn the air exchanges heat with the walls facing inwards and with the floors, and these exchange heat with the room to be air-conditioned. Specific sensors constantly monitor certain parameters (such as temperature, humidity, etc.) of the air within said gaps and in the air-conditioned rooms, regulating the flow of the fluid within the radiating pipes as well as the air-flow within the gaps according to the measured data. Air, moving at a very slow pace within the gaps or being kept still constantly provides a highly insulating layer, furthermore at a temperature which is very close to that of the air-conditioned room indoors, thus considerably reducing heat dissipation towards the outside. Both the thermally insulating panels placed within the various gaps and the metallic reflective sheets contribute to this purpose.

Still on the subject of lowering thermal dissipation, it is interesting to note that the various panels and metal sheets placed in the gaps have another positive effect with regards to radiating heat transfer. Let us consider for example the gaps in the side walls: the attached drawings table shows how in between the radiating pipe and the vertical thermally insulating panelling there is a continuous metallic sheet, which can be detached from said panelling; in this case, the thermal exchange occurring by radiation between pipes and insulating panels is automatically reduced by 50% following a well known thermal exchange physics principle. The same effect can have the other metallic sheet placed in proximity of the external wall. It is clear how the heat-flow dissipated by radiation from the gap containing the radiating pipe system to the outside, is automatically reduced by 75% merely from the use of the metallic sheets placed within.

This outcome is consolidated by the effect of the insulating panels that strongly limit exchange by conduction. Finally, the very slow air circulation within the gaps reduces heat loss by convection to very low levels.

Another aspect of the invention relates to a method of realizing the above system, the method being suitable, for its characteristics of simplicity and modularity, to be used in any type of buildings: housing, trade, industrial or classic ones, in reinforced concrete and bricks but also in different materials such as wood, iron panelling and so on; according to this invention, the method is particularly suitable to prepare prefabricated units as well.

The invention proposes a method for the realization of a building at a high heat-sound insulation consisting of a structure of vertical studs and horizontal beams joined together and including surfaces which overlook outside the building, where:

a) a series of bearing elements having horizontal holes are situated. These elements stretch out respect to the outer surfaces of the structure of studs and beams. Being properly placed far one from the others and lined up so as to form lines both vertically and horizontally, the elements create a symmetric and modular grid;

b) compatible joining and reinforcement elements are inserted into the horizontal holes;

c) bearing elements of each horizontal line are joined through structural shapes having a first and a second side placed as a L. One side of L stretches out horizontally outside;

d) elements of outer plugging are placed on the horizontal side of the structural shape which joins each horizontal bearing line in order to create the outer surface of the building;

e) a series of vertical parallel panels are properly placed inside the outer surface so as to form gaps are isolated among them;

f) a series of pipes where a fluid at desired temperature flows, is placed in correspondence with the most distant panel from the outer surface;

g) a beehive-like floor is placed on the surfaces of the horizontal beams of the structure; each cell of the beehive included an element of thin continuous walls which are parallel and form a series of gaps separated among them;

h) an insulating and/or thermally reflecting layer is placed on said floors;

i) a series of elements is placed on this layer; each element is mostly planar, peripherally endowed with short legs, at some distance, placed on the floor, thus creating a gap between the floor and the horizontal element; the cement layer is put on it and later the desired floor;

j) a series of pipes for the flowing of a fluid at desired, and utilities pipes, are inserted in the space between the horizontal element and the floor;

k) an inner wall is erected to close the space towards the outer surface of the building; it includes the above mentioned series of vertical panels.

It is to be noticed that such building method provides a space between floor and ceiling which is only in part filled with the various pipes, as above described communicating with the vertical gap between the most distant panel from the outer surface of the building and the inner wall. That contributes to the uniformity of the temperature in the space between floor and ceiling and in the said vertical gap.

Said bearing elements with horizontal holes can be formed by a first plate, vertically placed in the assembly, endowed, at back, with a projecting to be buried in the structure of studs and beams and, in front, with a second plate which stretches out orthogonally from the former and endowed with a hole having a proper shape and dimension.

In an alternative realization of bearing elements, the back projection is endowed with a third plate parallel to the first one and endowed with holes for fixing through screws, bolts and so on to the outer surface of the structure of studs and beams; therefore, in this alternative realization, the buried part of the bearing element in the structure of studs and beams can be not provided.

Such connection and reinforcement elements can be formed by extended, full or tubular bars, of any suitable section (round, square, polygonal etc), endowed at an extremity with a threaded tract and at the other extremity with a correspondent threaded dwelling. Alternatively, both the extremities can be threaded; in this case the joint between two bars can be carried out through a inner threaded connection; in this second realization, the threading at the two extremities of the bar can be right-handed and left-handed.

In the assembly of the elements of outer plugging which form the outer surface of the building, these elements can be made compatible with the connection elements. In this case, the element will have a hole so that at least a vertical line of elements can be put around the connection element, on its turn placed within the hole of the second plate.

In this way the outer plugging is, at regular intervals, vertically supported by connection elements and horizontally by the horizontal side of the structural shape at L, well connected to the bearing element joined to the structure of studs and beams.

Such bearing elements are furthermore endowed with hook-shaped elements to sustain horizontally extended bearing elements for the vertical panels, generally parallel and properly placed at distance so as to form a series of isolated gaps.

DETAILED DESCRIPTION OF THE INVENTION

The invention will now be described in more detail in relation to preferred realizations, illustrated just as an example and thus not imitative of the greatness of the invention itself, making reference to the attached drawing tables in which FIG. 1 represents a lateral section in elevation of part of a building unit according to the invention;

FIGS. 5, 5a and 5b represent the perspectives of two possible realizations of a bearing element according to the invention in question;

Figure 1:
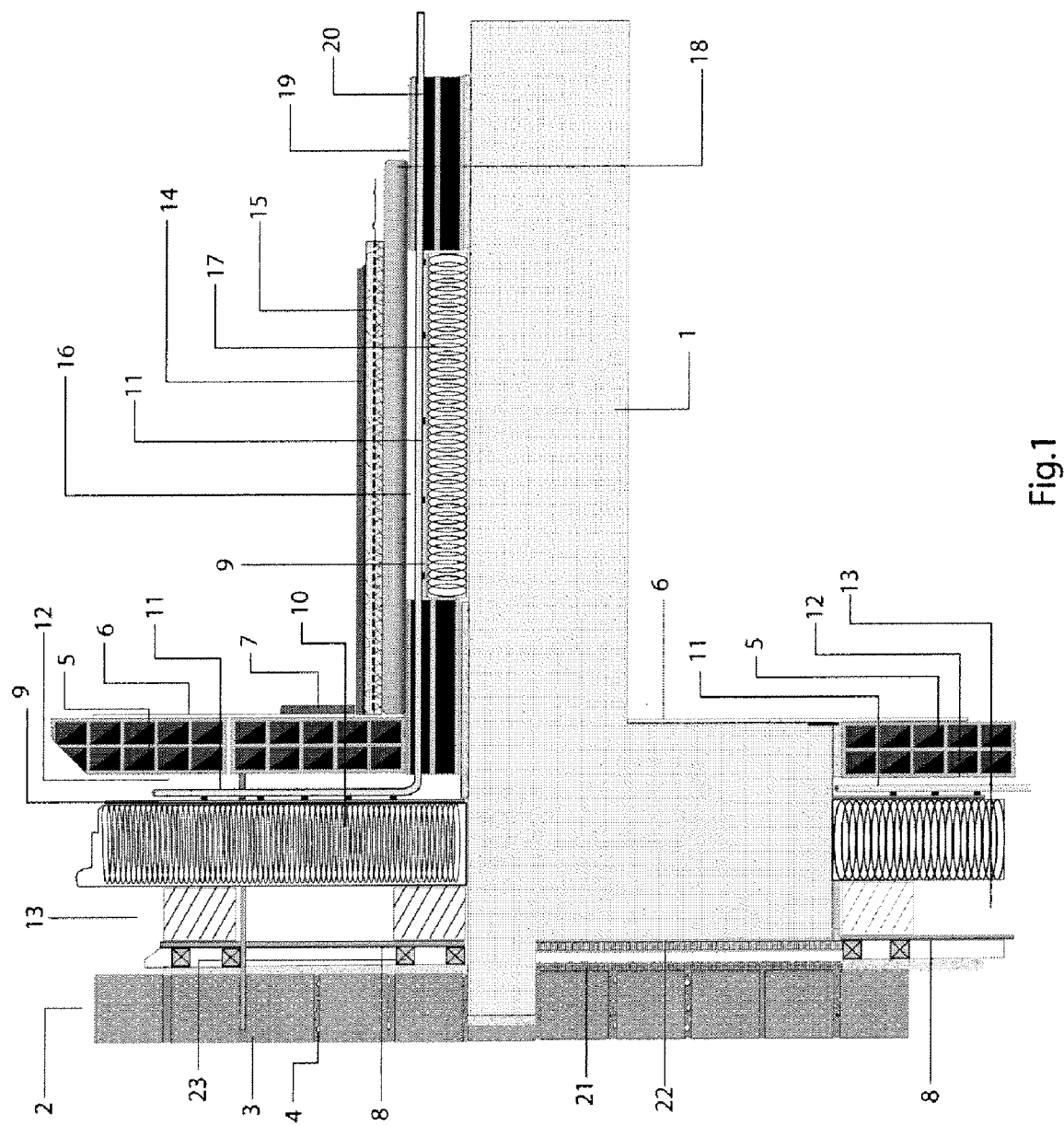

In the diagram of FIG. 1, hollow spacer elements (20), metallic sheets (19) made of aluminium for example, hollow flat tiles (18), a sub-layer (15) and a finishing layer (14) are placed above a base element (1) to create a floor; between this and the floor level (1) thanks to the spacer elements (20) a gap (16) is created, where thermally insulating horizontal panels (17), coated by a thin metallic sheet (9), are placed. Radiating pipes (11) run through the spacer elements (20) and the gap (16), circulating a fluid of geothermal origin. The metallic sheets 9 and 19 are laid continuously to provide a continuous impermeable and reflective surface, for example with regards to vapour.

A side wall (2) is built orthogonally to the floor (1) and comprises first external wall (3) of normal bricks bound by thermally insulating mortar (4). A second inner wall (5) is built at an appropriate distance from said first external wall (3); a continuous thermally insulating panel (10) is placed in the space or gap existing between said first and secondary wall, thus dividing said space in two secondary spaces 12 and 13.

The inwards facing side of the outside wall 3, coated with an insulating layer 21, is separated from the central gap 13 by a continuous panelling constituted by a metallic sheet, also separated from the thermally insulating element 10. This constitutes the outermost gap 23.

Radiating pipes (11) coming from the gap (16) between floor and ceiling, after having passed through the spacer elements (20), run through gap 12. A continuous panelling (9) constituted by metallic sheet is also placed within gap 12, preferably but not necessarily detached from panelling 10. Another continuous panelling (8), constituted by metallic sheet and including an insulating layer (21), is placed in the other gap (13) and detached both from the thermally insulating element (10) and from the inwards-facing side of the wall (3).

Panelling 8 is preferably made of breathable metallic sheet, or metallic sponge, allowing amongst other things, a certain amount of vapour transpiration to and from the outside.

Finishing elements such as plasterwork (6) and baseboard (7) complete the construction as usual.

In order to avoid unnecessary complication of the attached diagram as well as of this description, certain additional elements integral to the correct operation of the invention are not included in FIG. 1. Such elements shall now be briefly described, also in their functioning relation to the invention.

A first system including photovoltaic panels and/or wind-driven power generators, or the like, is utilised to generate electricity, which is then appropriately stored in accumulators; these power mechanical and heat pumps in a second system, for instance a geothermal one where appropriate fluids are extracted, treated and moved, channeling them through the above-mentioned radiating pipes system 11. The accumulators also power a series of fans that channel air to a filtration and dehumidification plant, then within at least two of the gaps described in relation to the attached FIG. 1, in order to form a layer of air at a desired temperature within said gaps, thus allowing air-conditioning in the adjacent rooms.

Additionally, a monitoring system keeps a series of parameters (such as temperature, humidity and flow) in check, throughout the gaps and the adjacent rooms; the monitoring system also provides management of the flow and temperature of the fluids inside the radiating pipes and of the flow and humidity of the air within the gaps, so as to keep air-conditioning throughout the building within the desired range.

Although the invention described above refers to a conventional construction type, it can also be adapted to prefabricated buildings, without modifying the concepts of the actual invention.

However, it is interesting to note how the specifications used so far in classifying new housing units (for example the above-mentioned classification in use in the province of Bozen) even though using a consumption value expressed in $KW m^2/year$, actually refer to the actual consumption of fossil fuels, such as diesel fuel expressed in $I m^2/year$. After the above description it can be appreciated how the housing units built after the invention described herewith, utilise exclusively renewable energy sources (solar, wind-power, geothermal), therefore they are truly zero-emission units. This way it is possible to achieve cancellation of harmful emissions ($CO_2$, $NO_x$, HC particles), obtaining a system that does not consume, but rather utilises energy in a more economical fashion.

Figure 2:
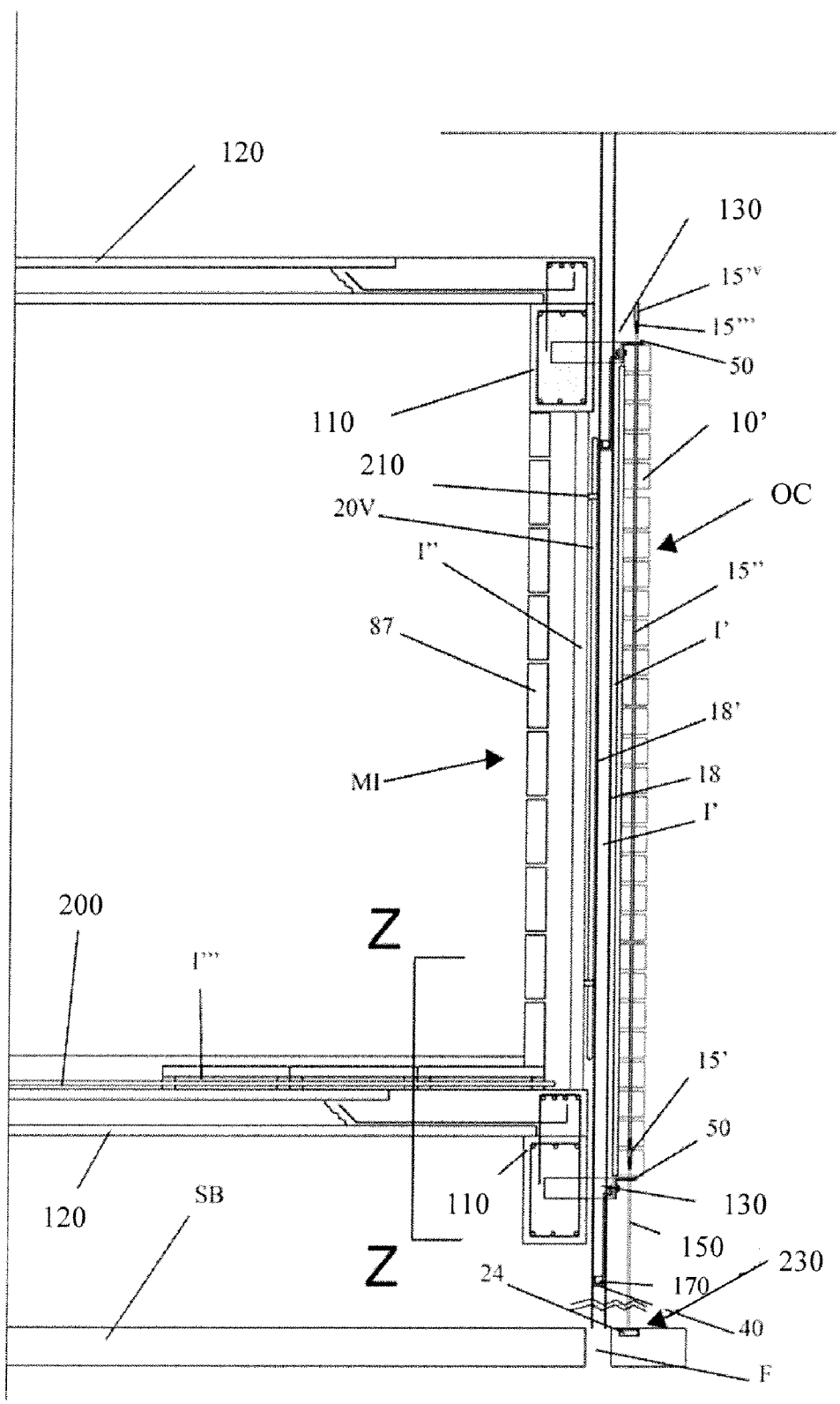
FIG. 2 represents a vertical section of a wall built according to the invention in question.
Figure 3:
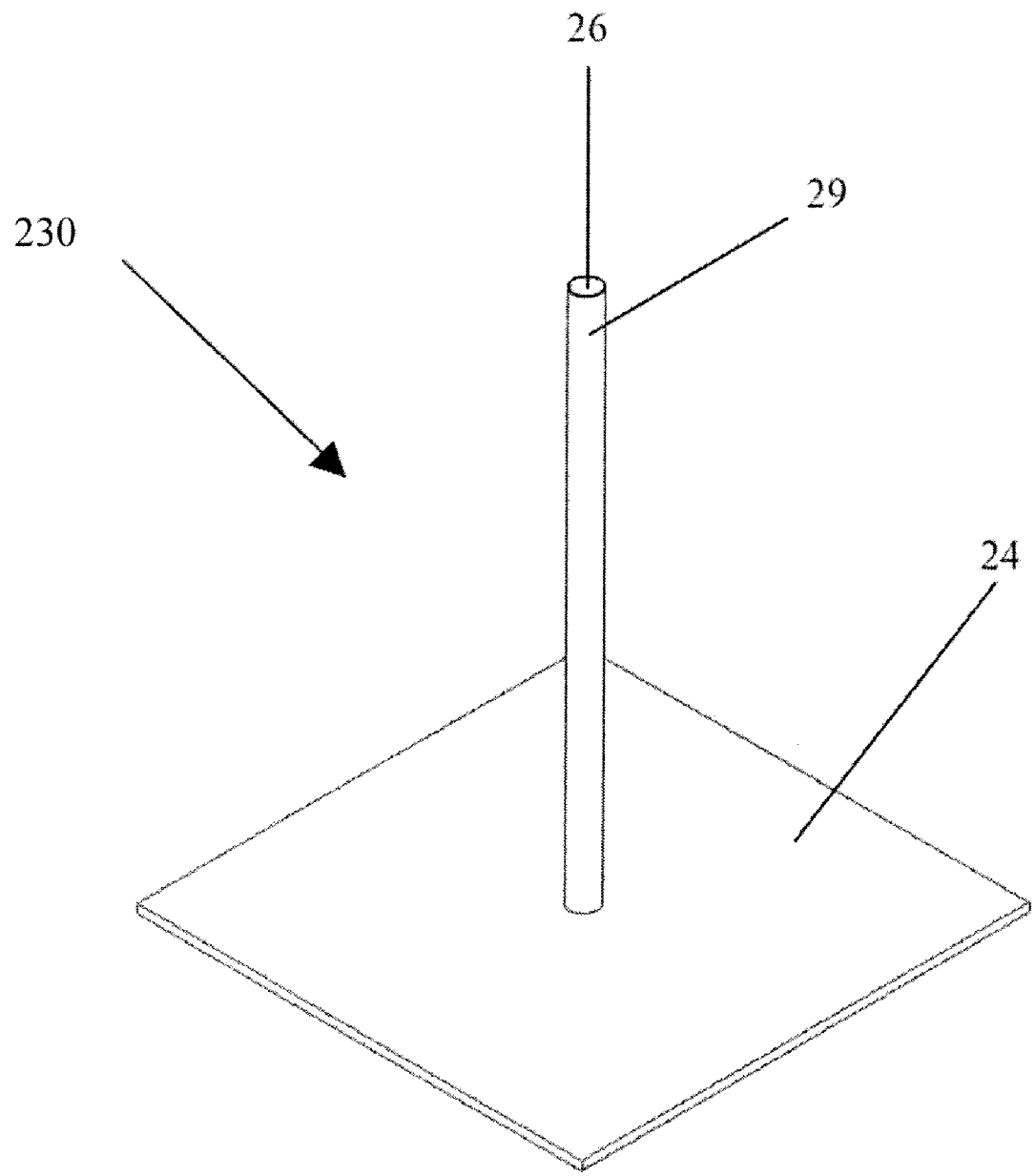
FIG. 3 represents a perspective of a basic element including a bar according to the invention in question.
Figure 4:
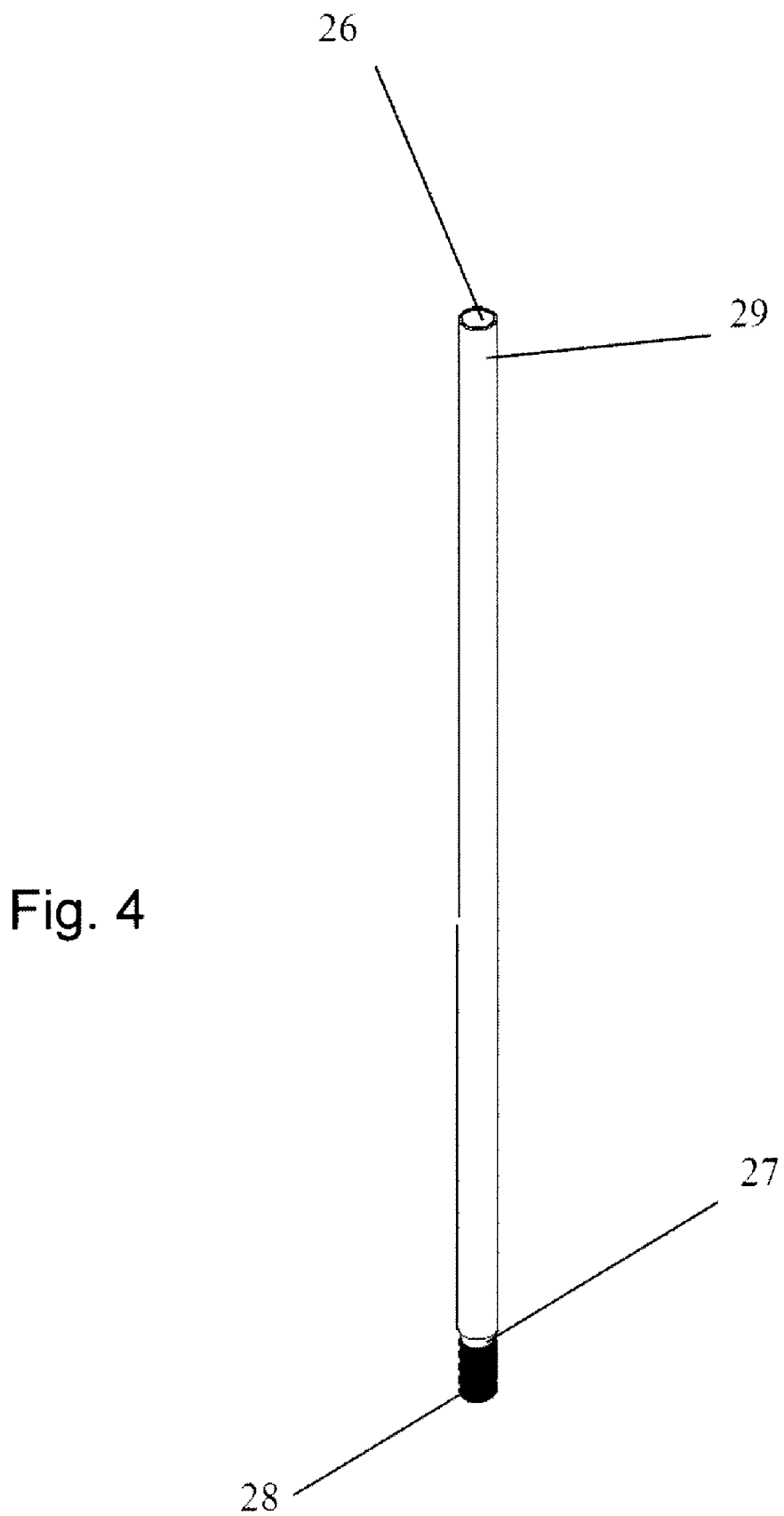
FIG. 4 represents the view of a bar according to the present invention.

With reference to FIG. 2, relative to a traditional building in reinforced concrete and bricks, it is possible to see part of a basic structure (the pillars or vertical columns are not represented) on the horizontal beams 110 on which floors 120 are placed. Having structural shapes at L 50, bearing elements 130 are connected with such beams. The base 24 of the anchorage 230 (FIG. 3) is connected to a peripheral part of the ceiling of base SB. It has a first bar 150, endowed with inner threading 26 in correspondence with its extremity 29 (FIGS. 3 and 4), and anchored in the opposite extremity to the base 24. This bar perpendicularly crosses the structural shape at L (or better, the joining plate—which is not shown—between two structural shapes at L) is connected in 15' to a second bar 15" similar to the former and endowed with inner threading, 26, and outer 28, at the extremities 29 and 27, respectively. On the bar 15" we put a first vertical line of elements 10' which form the outer covering (OC), placed on the horizontal beam of the structural shape at L 50. So doing, the support on the horizontal beam of the structural shape and the support of the bars 15"(which, as it has already been said, are situated, at regular intervals, horizontally along the perimeter of the building) consolidate and make the outer covering stable. The bars 15" are connected in 15''' to bars 15'''' which allow to continue the laying of the outer covering on the whole outer surface of the building.

Therefore, the horizontal lines of bearing elements and structural shapes at L, along with the bars placed vertically, form a regular grid which occupies all the lateral perimeter extension of the building.

As it is possible to notice in FIG. 2 (and in FIG. 5) the bearing elements are placed in such a way that during the realization of the outer covering OC, this will be far from the elements of the basic structure (studs and beams), in this way, a double advantage is obtained; on the one side, we can reduced to the minimum the thermal bridges between the outer covering and the inner structure of the building, on the other side, as already said and better described later, we put into communication the existing gaps underneath the floor and within the peripheral walls of the building; this contributes to make uniform the thermal transmission from the gaps, which are thermally active, to the inside of the building itself.

When the realization of the outer covering (OC) is ended, we place bars 170, similar to bars 150 horizontally on the hooks 40 (see also FIG. 5) of the bearing elements. Thin panels 18, 18' will be located on these bars. In a favourite realization, these panels consist of thin metallic sheets (for instance, in aluminium alloy) which can be perpendicularly extended over the entire height of the building and be properly overlapped and joined together so as not to make the gaps communicate.

According to such favourite realization, the metallic sheets, available in the shape of a belt, are winded round the bars in order to form a continuous ring, from the first to the last ceiling. Therefore, being these belts at same distance among themselves, from the outer covering (OC) and from the inner walls MI (IW), three gaps will be made up: the first I, between the outer covering and the first inner belt, located towards the outer covering; the second, I' between inner and outer belt, and the third, I", between inner belt and inner walls (IW); the three gaps spaces allow a remarkable reduction of the thermal stream between the environment outside the building and the inner environment of the building itself.

In the third gap pipes will be placed inside which a fluid at desired temperature flows. This fluid ensures the air-conditioning of the building.

When the laying of belts and pipes has been completed, the inner walls (IW) can be erected.

In order to obtain such an air-conditioning, the underground thermal flows could be exploited and properly utilized when in the base ceiling SB some openings F, at proper distance, in correspondence with gaps I, I' and I".

Figure 5:
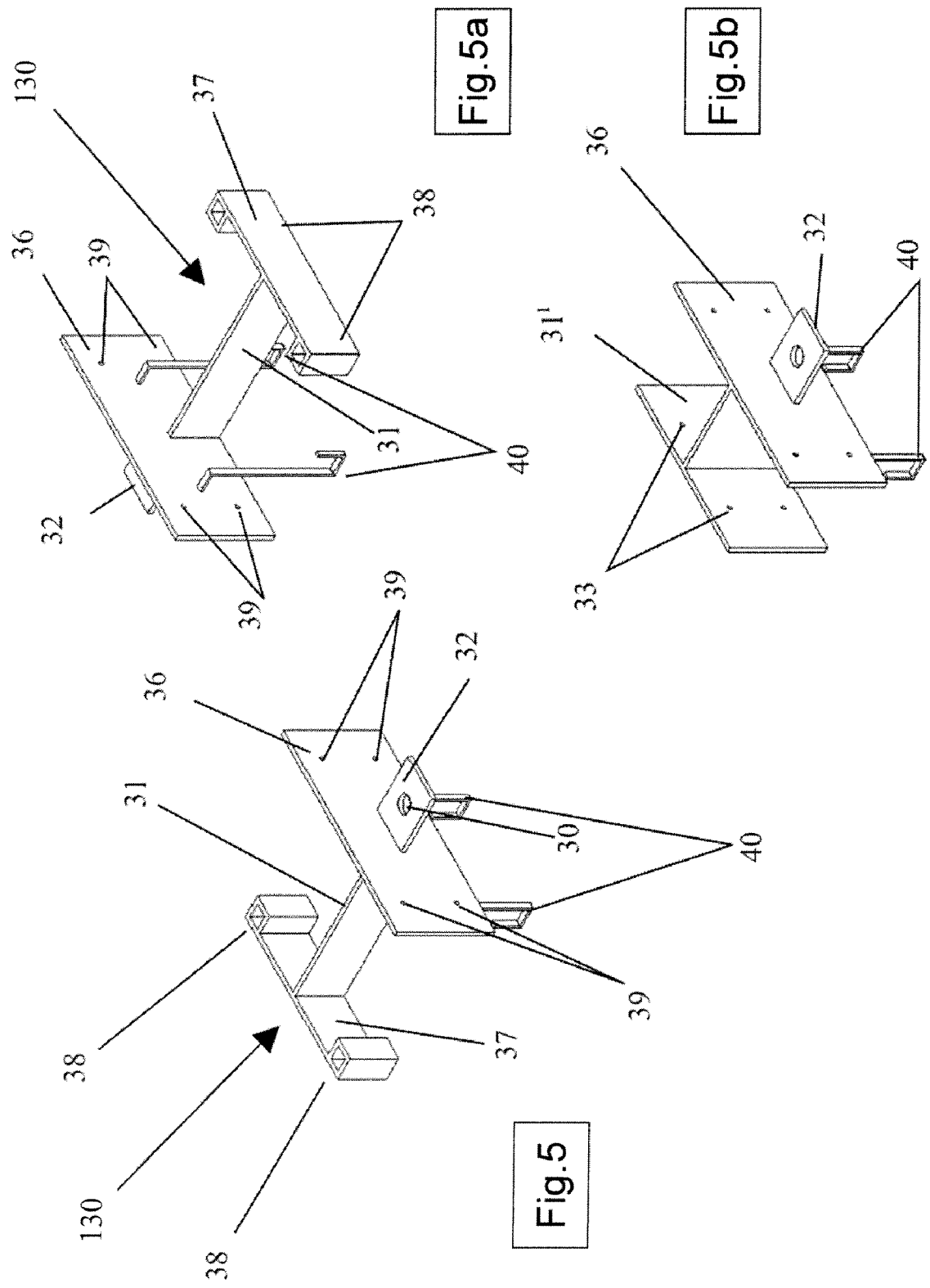

FIGS. 5 and 5a show, respectively, a front and a back perspective of a first realization of the bearing element 130. This bearing element includes a plate 36 endowed with holes 39, a second front plate 32 endowed with a hole 30, and a third back plate 31; again, at the back, the plate 36 has hooks 40. A fourth plate 37 with two tubular elements at the two extremities, for instance at rectangular section, is connected to the plate 31.

A second possible realization of the bearing element 130 is shown in FIG. 5b; in this realization of the bearing element 130, the back plate 31 has, at some distance and parallel to the plate 36, a plate 31' endowed with holes 33.

Figure 6:
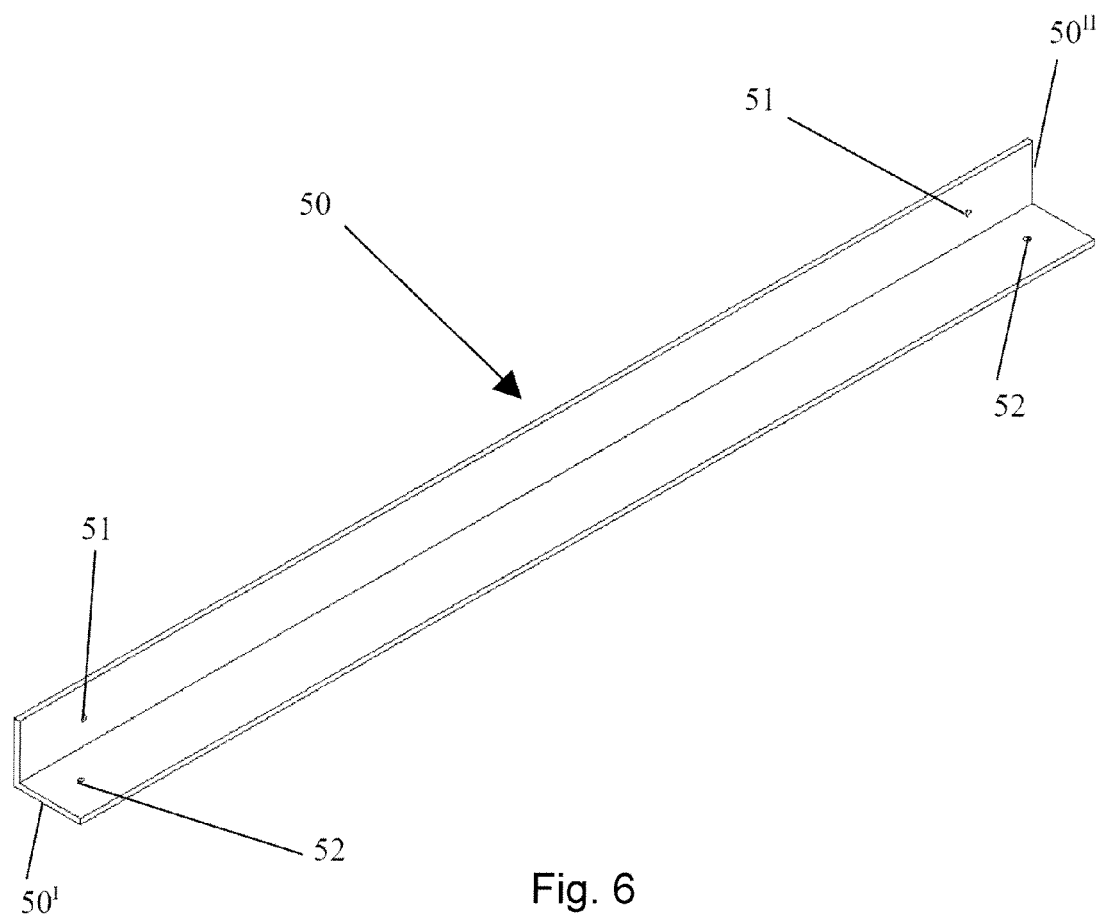
FIG. 6 represents a perspective a structural shape at L which acts as a connection between bearing elements horizontally lined up.

FIG. 6 shows the structural shape at L 50 that near its extremities 50' and 50" is endowed with holes 51 and 52 for its connection to the bearing element 130 and to the joining plate 60 (FIG. 6) respectively.

Figure 7:
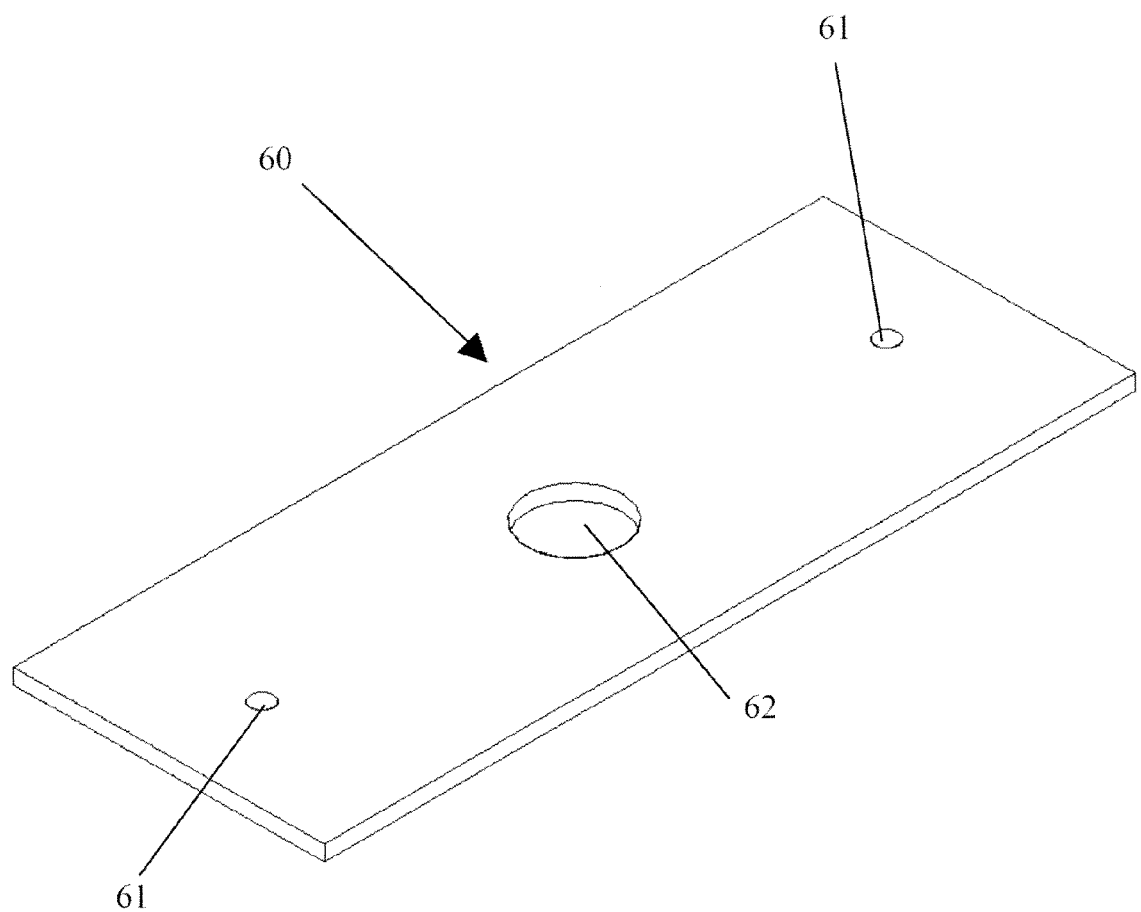
FIG. 7 represents a joining plate between two adjoining structural shapes at L.

FIG. 7 shows a plate 60 joining to structural shapes at L endowed with holes 61 arranged for such a connection, and with a hole 62 to place the bar 150. It is evident that said hole 62 as well as the hole 30 of the bearing element 130 is suited for its shape, to the bar 150 which, as previously said, can have any sort of desired and suitable section (round, square, polygonal etc.).

Figure 8:
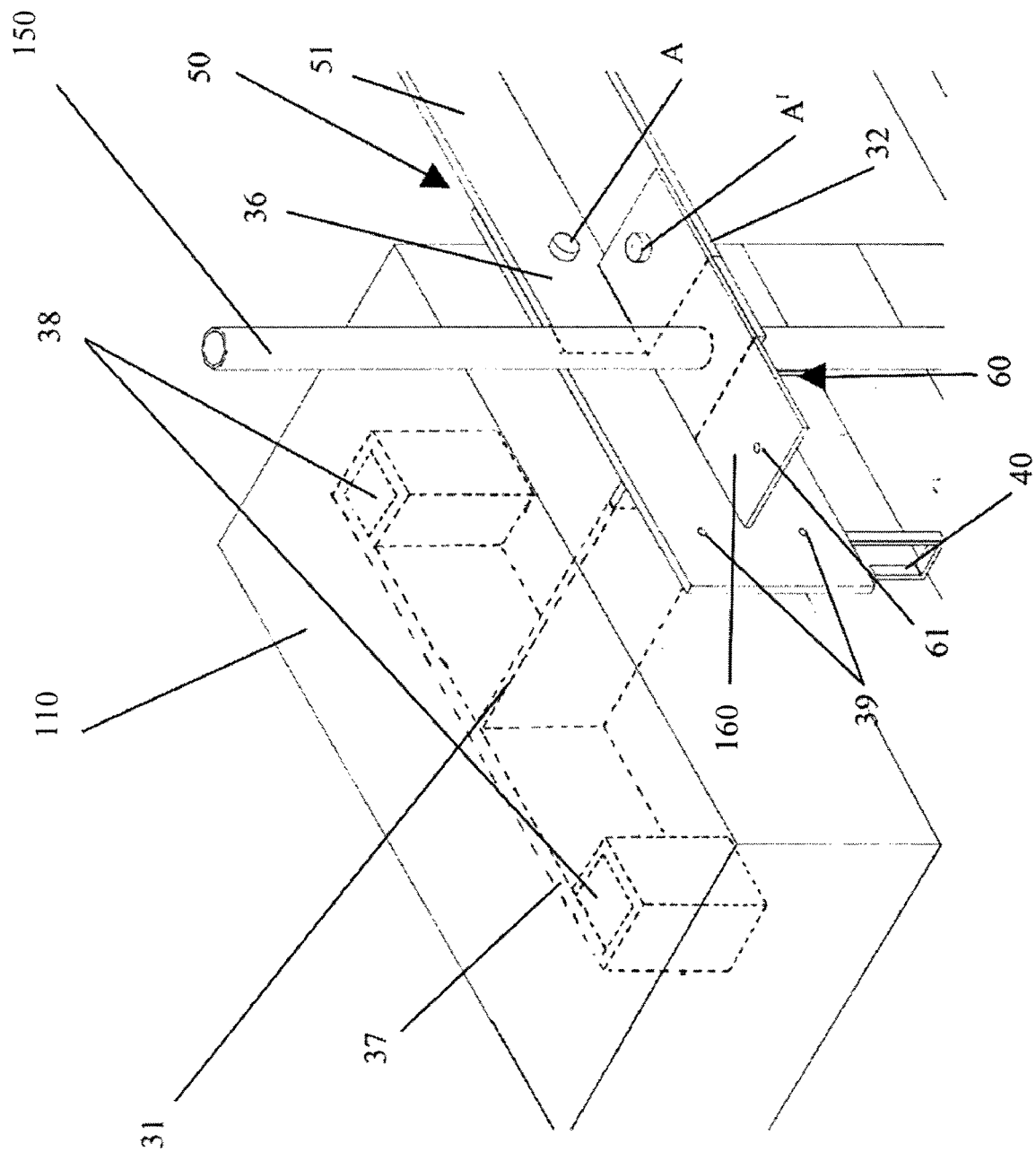
FIG. 8 represents a perspective of a bearing element connected to a structure of studs and beams and endowed with a structural shape at L, a joining plate between structural shapes at L and a bar.

FIG. 8 shows an assembly, according to the invention in question, of the fundamental parts to erect an outer covering (OC). The back plate 31 of the bearing element 130 is buried in the structure 110 whilst the plate 36, at proper distance from the structure 110, is connected through the bolt A to the wing 51 and through the bolt A' both to the plate 60 and to the other wing of the structural shape 50. A bar 150 is inserted in the proper holes, not visible, of the plate 60 and the underneath plate 32 of the bearing element 130.

Figure 9:
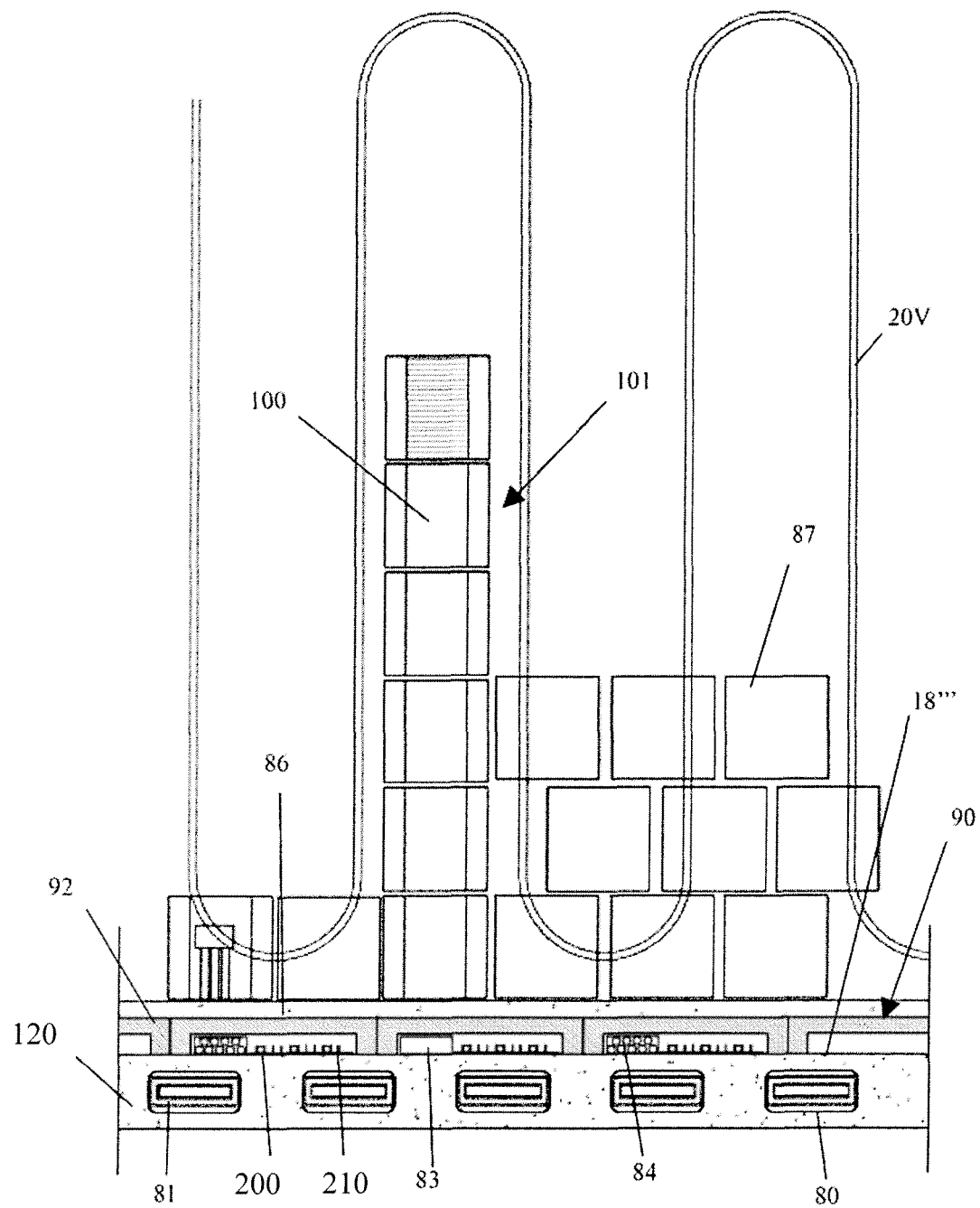
FIG. 9 represents a section according to the plane Z-Z of the FIG. 2.

FIG. 9 shows a partial view in elevation of the realization obtained according to the invention in question in relation to the section plane Z-Z of FIG. 2. The ceiling 120 is beehive-hollow and shows a series of passing cells 80 where structures 81 can be placed. These structures are formed by some panels or thin sheets, at a proper distance, in order to divide the volume of the cells into a series of gaps, so improving the heat-sound insulation of the ceiling itself.

Thin panels 18''' are placed on the ceiling up to cover the entire surface without any uncovered part. After that, carrying-pipe structures 210 are placed on thin panels 18'''; said structures keep, in the correct position, pipes 200 within which a desired fluid runs in order to obtain the air-conditioning of the building. Structures 83, properly isolated and fireproof, can be placed next to said carrying pipes. They will contain systems 84 of pipes and cables necessary for utilities of the building (air, water, telephone, power and so on. In correspondence with said structures and placed in the inner walls 87, it is possible to assemble suitable bricks 101 having a cross-section at C (see FIG. 11) that can receive the above mentioned structures 83 in the free channel 100 where at least part of systems 84 of pipes and cables will be inserted.

Elements 90 (see FIG. 10) are placed on the ceiling 120 and at covering pipes 200 and structures 83. Elements 90 consist of a shelf 91 that peripherally has relatively short bearing legs, for instance near its corners. So doing, the parts placed on the ceiling will be protected and a new gap created; said gap is extended along the entire area of the ceiling and communicates with the vertical gap I'' (see FIG. 2).

Finally, vertical pipes 20V (see also FIG. 2) for air-conditioning are assembled in proper pipe-trays (which are not shown); at this point the inner walls (IW), made of bricks 87 or similar, is erected.

Figure 10:
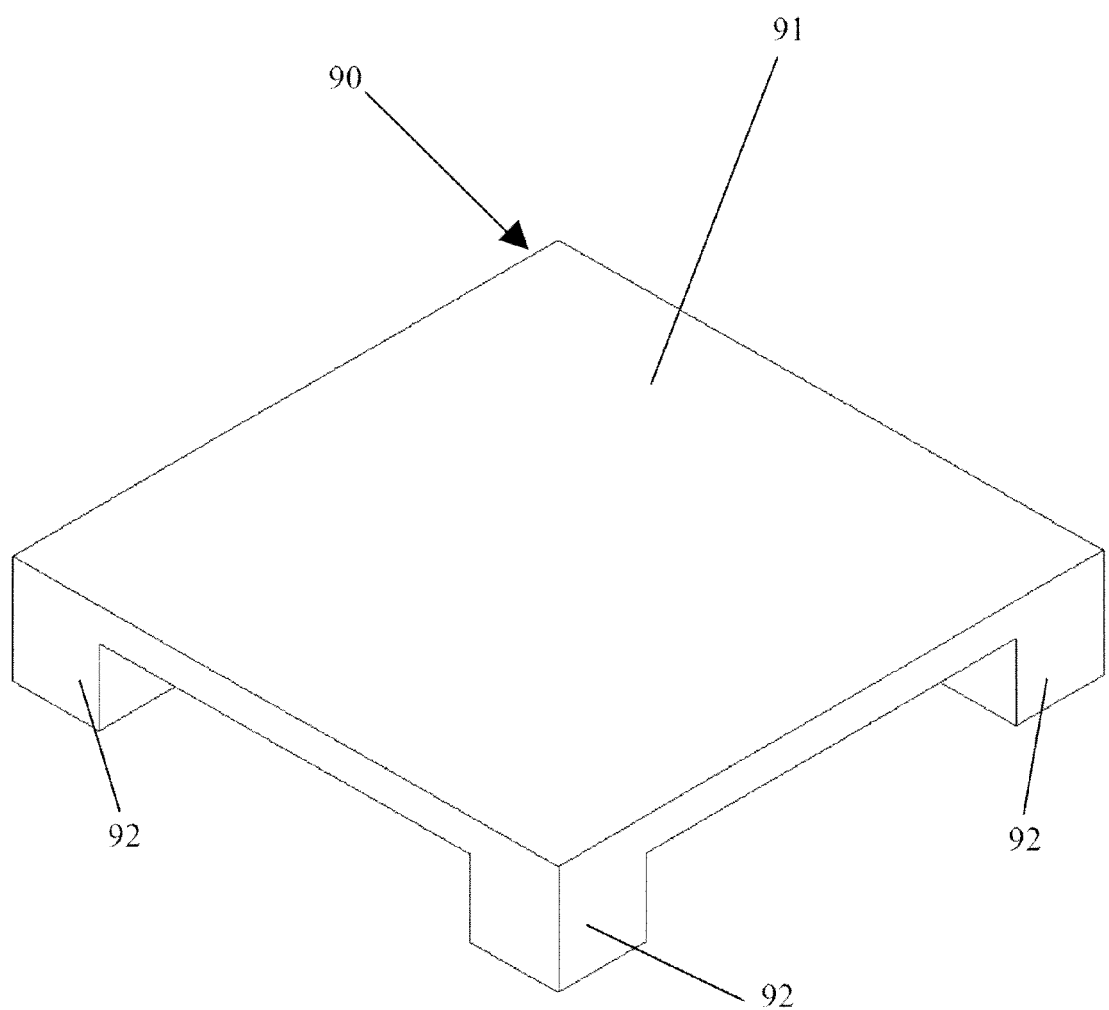
FIG. 10 represents a perspective of a general planar element, peripherally endowed with legs at some distance.

FIG. 10 represents a possible realization of elements 90 which can be in bricks, expanded conglomerate or other suitable materials.

Figure 11:
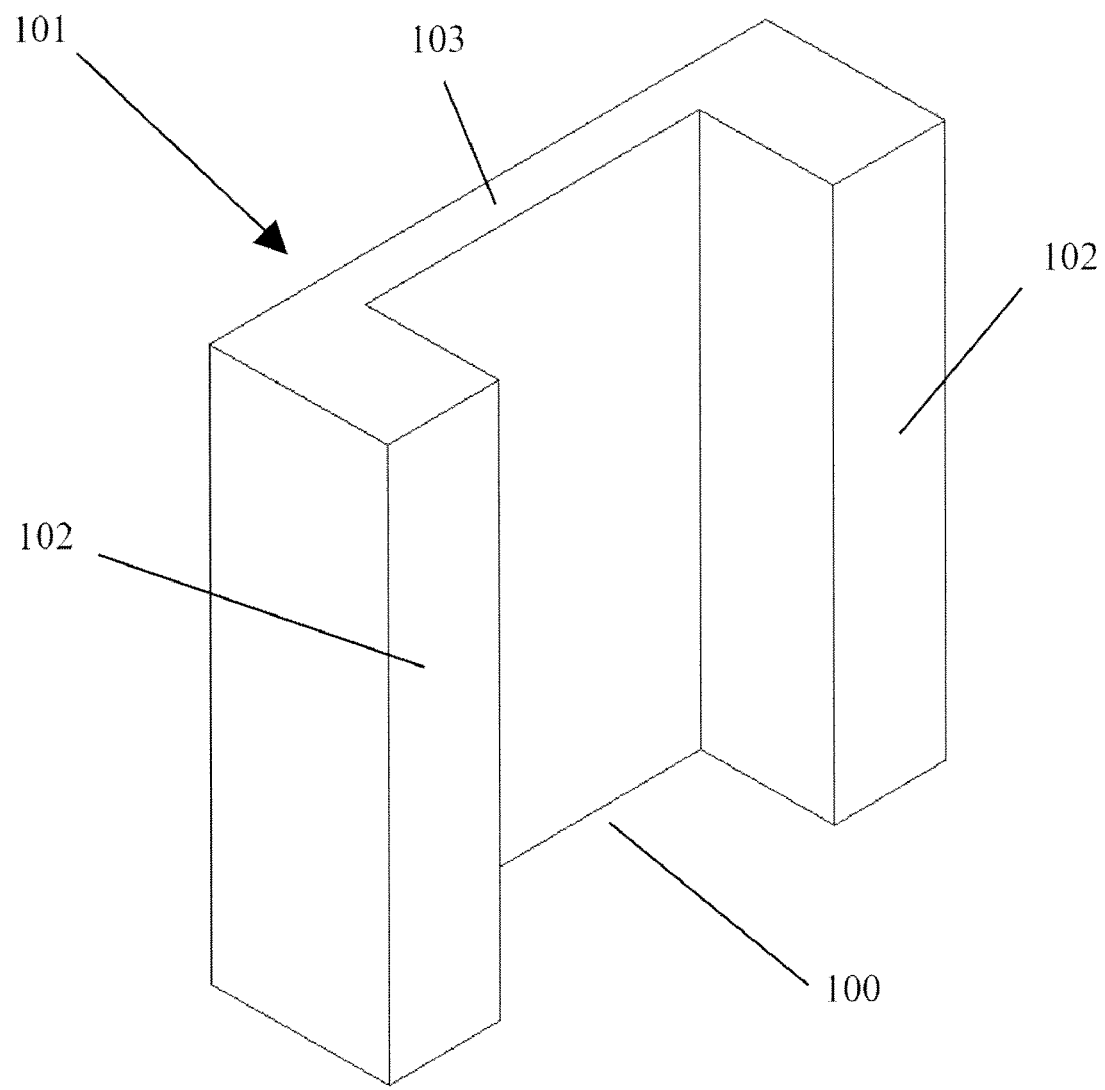
FIG. 11 represents a perspective of a building element having a general C shape, whose function will be discussed later.

The element 101 is shown in FIG. 11 and consists a square level body having projections 102 in correspondence of its opposite and parallel borders. Between the level body 103 and the projection 102, this pattern created a hollow space 100 which can be properly utilized, as already specified, to contain pipes and cables.

I claim:

1. A climate control system for a building, which includes at least one perimeter wall and at least one floor, said climate control system comprising:
    a first system configured to generate and accumulate electricity from renewable sources;
    a secondary geothermic system configured to capture fluids at a temperature within a predetermined range, wherein the at least one perimeter wall and the at least one floor comprises a plurality of parallel, spaced-apart continuous panels, void spaces or gaps being defined between said panels;
    a third system of variable capacity air-flow circulation; and
    a fourth system configured to monitor and control temperature and humidity of said air-flow,
        wherein said at least one perimeter wall further comprises an external wall and an internal wall defining a gap therebetween, with the gap being divided into at least a first gap, a second central gap, and a third gap by the plurality of spaced-apart continuous panels, said first gap is towards the external wall, and said second central gap and said third gap are towards the internal wall,
        wherein at least one primary vertical panel sheeting is made of thermally insulating material, with the second central gap towards the external wall, and including a thin second panel sheeting made up of a breathable metallic sheet separated from the external wall, the side of said vertical panel sheeting is directly facing the internal wall provided with an impermeable metal sheet reflective to thermal fluxes,
        wherein a gap underneath the floor is insulated from the floor below by a horizontal panel made of thermally insulated material and including, on the side facing the floor, a continuous breathable metal sheet reflective to thermal fluxes, and
        wherein a number of radiating pipes are laid out within said gap beneath the floor and in the third gap facing the internal wall with the fluid flowing within said radiating pipes at a desired temperature and coming from said geothermic system, said variable capacity air-flow is directed in at least some of said first, second central, and third gaps.

2. The climate control system according to claim 1, wherein within the third gap and the gap underneath the floor treated and dehumidified air is circulated, being monitored and regulated by a centralized remote control system.

3. The climate control system according to claim 1, wherein metallic sheets are laid out on the at least one primary vertical panel sheeting and the horizontal panel is placed in the gaps within the side walls and the floor, being integral with or detached from the at least one primary vertical panel sheeting and the horizontal panel,
    wherein optionally the metallic sheets are formed in the shape of a belt.

4. The climate control system according to claim 1, where the third gap and the gap underneath the floor on each floor of the building are reciprocally interconnected.

5. An apparatus to high heat-sound insulate a building,
    wherein the apparatus is contained within or on the building, and the building has a structure having interconnected studs and beams and surfaces projecting outside the building, comprising:
said apparatus comprising:
bearing elements, with horizontal holes, stretching out with respect to outer surfaces of the structure of studs and beams, wherein said bearing elements are spaced-apart and lined-up to form both horizontal and vertical lines and to form a symmetric and modular grid;
joining and reinforcement elements inserted into the horizontal holes, wherein the bearing elements of each horizontal line are each joined through a structural shape having a first and a second sides placed in an L position with respect to each other, where one of the first and second sides stretches out horizontally outside;

elements of an outer plugging are placed on the horizontal side of the structural shapes, which join each horizontal line to form an outer surface of the building;

vertical panels are configured inside the outer surface and placed in parallel and space-apart from each other, are placed to form isolated gaps;

pipes, where a fluid at predetermined temperature flows, are placed in correspondence of the most distant panel of the vertical panels from the outer surface of the building;

a ceiling on the surfaces of the horizontal beams of the structure, the ceiling comprising a series of passing cells, wherein each cell has placed within an element comprising continuous parallel thin walls which define a series of isolated gaps;

an insulating and/or thermally reflecting layer on the ceiling;

planar elements placed on the insulating layer, wherein the planar elements are peripherally endowed with space apart short legs, placed on said ceiling to define an empty space between the ceiling and a horizontal element, wherein a cement layer is placed on it, and a desired floor;

pipes to enable fluid-flow at a predetermined temperature and for utilities placed between the horizontal element and the ceiling; and erected inner walls configured to close the space existing in the outer surface of the building and comprising the vertical panels.

6. The apparatus according to claim 5, wherein the empty space defined by the planar element is in part filled with pipes and communicates with the vertical gap existing between the most distant panel from the outer surface of the building and inner walls.

7. The apparatus according to claim 5, wherein the bearing element comprises a first plate vertically placed endowed, at the back, with a projection to be buried in the structure of studs and beam and, in front, with a second plate orthogonally projecting from the former, with a hole of suitable shape and dimension.

8. The apparatus according to claim 7, wherein the back projection of the bearing element is endowed with a third plate parallel to the first and having holes for fixing through screws, bolts to the outer surface of studs and beams.

9. The apparatus according to claim 5, wherein the joining and reinforcement elements comprise extended, full or tubular, bars endowed, at a first extremity, with a threaded tract and, at the second extremity, with a correspondent threaded bush, wherein optionally the bars have wound around them metallic sheets formed in the shape of a belt wound around the bars in order to form a continuous ring.

10. The apparatus according to claim 5, wherein in an assembly of the elements of the outer plugging, the same elements are provided with at least a passing hole so that at least a vertical line of the elements are placed round the bar which, on its turn, is placed within the hole of the second plate.

11. The apparatus according to claim 5, wherein the bearing elements are endowed with hooks to horizontally sustain bars as a support for vertical parallel and space-apart panels to define a series of isolated gaps.

12. The apparatus according to claim 5, wherein the vertical panels forming the isolated gaps are in the shape of metallic sheets which perpendicularly extend over an entire height of the building.

13. The apparatus according to claim 5, wherein the inner walls comprise bricks having a C shaped cross section.

14. A building comprising a climate control system, comprising:

a first system configured to generate and accumulate electricity from renewable sources, wherein the building comprises at least one perimeter wall and at least one floor;

a secondary geothermic system configured to capture fluids at a temperature within a predetermined range, wherein the at least one perimeter wall and the at least one floor comprises a plurality of parallel, spaced-apart continuous panels, void spaces or gaps being defined between said panels;

a third system of variable capacity air-flow circulation; and a fourth system configured to monitor and control temperature and humidity of said air-flow, wherein said at least one perimeter wall further comprises an external wall and an internal wall defining a gap therebetween, with the gap being divided into at least a first gap, a second central gap, and a third gap by the plurality of spaced-apart continuous panels, said first gap is towards the external wall, and said second central gap and said third gap are towards the internal wall, wherein at least one primary vertical panel sheeting is made of thermally insulating material, with the second central gap towards the external wall, and including a thin second panel sheeting made up of a breathable metallic sheet separated from the external wall, the side of said vertical panel sheeting is directly facing the internal wall provided with an impermeable metal sheet reflective to thermal fluxes, wherein a gap underneath the floor is insulated from the floor below by a horizontal panel made of thermally insulated material and including, on the side facing the floor, a continuous breathable metal sheet reflective to thermal fluxes, and wherein a number of radiating pipes are laid out within said gap beneath the floor and in the third gap facing the internal wall with the fluid flowing within said radiating pipes at a desired temperature and coming from said geothermic system, said variable capacity air-flow is directed in at least some of said first, second central, and third gaps.

15. The building according to claim 14, wherein within the third gap and the gap underneath the floor treated and dehumidified air is circulated, being monitored and regulated by a centralized remote control system.

16. The building according to claim 14, wherein metallic sheets are laid out on the at least one primary vertical panel sheeting and the horizontal panel is placed in the gaps within the side walls and the floor, being integral with or detached from the at least one primary vertical panel sheeting and the horizontal panel.

17. The building according to claim 14, where the third gap and the gap underneath the floor on each floor of the building are reciprocally interconnected.

18. A building comprising an apparatus to high heat-sound insulate the building:

wherein the apparatus comprises:

bearing elements, with horizontal holes, stretching out with respect to outer surfaces of a structure of studs and beams, wherein said bearing elements are spaced-apart and lined-up to form both horizontal and vertical lines and to form a symmetric and modular grid;

joining and reinforcement elements inserted into the horizontal holes, wherein the bearing elements of each horizontal line are each joined through a structural shape having a first and a second sides placed in an L position with respect to each other, where one of the first and second sides stretches out horizontally outside;

elements of an outer plugging are placed on the horizontal side of the structural shapes, which join each horizontal line to form an outer surface of the building;

vertical panels are configured inside the outer surface and placed in parallel and space-apart from each other, are placed to form isolated gaps;

pipes, where a fluid at predetermined temperature flows, are placed in correspondence of the most distant panel of the vertical panels from the outer surface of the building;

a ceiling on the surfaces of the horizontal beams of the structure, the ceiling comprising a series of passing cells, wherein each cell has placed within an element comprising continuous parallel thin walls which define a series of isolated gaps;

an insulating and/or thermally reflecting layer on the ceiling;

planar elements placed on the insulating layer, wherein the planar elements are peripherally endowed with space apart short legs, placed on said ceiling to define an empty space between the ceiling and a horizontal element, wherein a cement layer is placed on it, and a desired floor;

pipes to enable fluid-flow at a predetermined temperature and for utilities placed between the horizontal element and the ceiling; and erected inner walls configured to close the space existing in the outer surface of the building and comprising the vertical panels.

19. The building according to claim 18, wherein the empty space defined by the planar element is in part filled with pipes and communicates with the vertical gap existing between the most distant panel from the outer surface of the building and inner walls.

20. The building according to claim 18, wherein the bearing element comprises a first plate vertically placed endowed, at the back, with a projection to be buried in the structure of studs and beam and, in front, with a second plate orthogonally projecting from the former, with a hole of suitable shape and dimension.

21. The building according to claim 20, wherein the back projection of the bearing element is endowed with a third plate parallel to the first and having holes for fixing through screws, bolts to the outer surface of studs and beams.

22. The building according to claim 18, wherein the joining and reinforcement elements comprise extended, full or tubular, bars endowed, at a first extremity, with a threaded tract and, at the second extremity, with a correspondent threaded bush.

23. The building according to claim 20, wherein in an assembly of the elements of the outer plugging, the same elements are provided with at least a passing hole so that at least a vertical line of the elements are placed round a bar which, on its turn, is placed within the hole of the second plate.

24. The building according to claim 18, wherein the bearing elements are endowed with hooks to horizontally sustain bars as a support for vertical parallel and space-apart panels to define a series of isolated gaps.

25. The building according to claim 18, wherein the vertical panels forming the isolated gaps are in the shape of metallic sheets which perpendicularly extend over an entire height of the building.

26. The building according to claim 18, wherein the inner walls comprise bricks having a C shaped cross section.

27. The building according to claim 18, wherein the building comprises at least one of a home, a work place, a detached house, a prefab building, an industrial building, or a trade building.

* * * * *